Patented Jan. 29, 1946

2,393,894

UNITED STATES PATENT OFFICE 2,393,894

TERPENE SEPARATION

Nicholas T. Farinacci, Wilmington, and William J. Kirkpatrick, Marshallton, Del., assignors to Hercules Powder Company, Wilmington, Del., a corporation of Delaware No Drawing. Application April 24, 1943, Serial No. 484,474

10 Claims. (Cl. 260—675.5)

This invention relates to a process for the separation of camphene from a terpene mixture, and particularly to the separation of pinene from camphene.

The chemical literature is extensive on the isomerization of pinene to camphene. Many methods have been disclosed showing a one-step catalytic conversion of pinene to camphene, but none of these methods are capable of a 100% conversion, few are capable of a conversion of more than 50%, and most are capable of a conversion of less than 50%. In every case, the resulting mixture after isomerization contains a considerable percentage of unreacted pinene. When it is desirable to obtain substantially pure camphene, it is practically impossible to separate the unreacted pinene from the camphene by ordinary methods of distillation.

Now, in accordance with the present invention, it has been discovered that camphene may be effectively, efficiently, and economically separated from other terpene components having a boiling point relatively close to the boiling point of camphene by heating the terpene mixture above its boiling point in the presence of a catalyst having an alkaline reaction and separating the components in the resulting mixture by ordinary means of distillation.

A method of carrying out the process of this invention is illustrated by the following specific example, which is not to be construed as limiting, in which the parts expressed are by weight:

Example

One hundred parts of freshly distilled commercial alpha-pinene (known in the trade as Hercules Pinene 111) containing about 95-98% alpha-pinene were heated to the reflux temperature. Five parts of heat-expanded vermiculite (Zonolite) were added rapidly but in small portions and the mixture was then heated at the reflux temperature with vigorous stirring. Provision was made for removing any water reaching the reflux condenser. About 93-95% of the pinene had been isomerized in the first 5 to 10 minutes of reaction time. After this time, the reaction mixture was cooled and the catalyst filtered out.

This filtered reaction mixture was then charged into a silver-lined pressure vessel with equal parts by volume of 1.33% aqueous sodium hydroxide. The mixture was heated for 2 hours at 260° C. under vigorous agitation. The reaction mixture was cooled and separated into layers. The oil layer was washed free of sodium hydroxide with water. It was then subjected to steam distillation, 95 to 97% being volatile with steam. The other 3 to 5% was polymer. The steam volatile portion was analyzed by a combination of fractional distillation, bromination, and catalytic hydrogenation giving the following composition of the mixture:

| | Per cent |
|---|---|
| Pinene | 1.3 |
| Camphene | 69 |
| Menthadiene | 13 |
| p-Cymene, p-menthene, and p-menthane | 16.6 |

The terpene mixture used in the example was prepared by means of the isomerization of alpha-pinene using vermiculite as the catalyst and carried out under conditions controlled in such a manner as to cause 93% of the pinene to be converted to camphene and para-menthadienes, leaving about 7% unchanged pinene. However, any starting material containing camphene and at least one other terpene isomerizable under the conditions of this invention may be used.

Separation of camphene from terpene mixtures may be made in accordance with the conditions of isomerization shown here when the camphene is present in amounts from about 5 to about 95% of the total amount of terpenes present in the mixture to be separated.

The present method of camphene separation is particularly applicable to terpene mixtures containing a preponderance of camphene as, for example, terpene mixtures resulting from the isomerization of pinene using such mineral type catalysts as, for example, vermiculite, fuller's earth, Floridin (dried Florida earth), Japanese acid clay, kaolin, alumina, silica, silicates of lime and alumina, kieselguhr, red phosphorous, phosphate of alumina, charcoal, montmorillonite, aluminosilicic acids, etc. Other catalysts are those of the inorganic type as, for example, metaboric acid, pyro-boric acid, silica gel that has been surface activated, titanic acid, silicic acid, triphosphoric acid, penta-phosphoric acid, vanadic acid, antimonic acid, phosphotungstic acid, silico-tungstic acid, etc. Further catalysts are of the organic type as, for example, oxalic acid, acetic acid, valerianic acid, butyric acid, palmitic acid, benzoic acid, phthalic acid, etc.

Some of these catalysts are so powerful that the camphene itself is used up, in some cases going to polymers, in other cases to para-menthene, para-menthane, and para-cymene. Some of the other catalysts are so feeble that they cause only a low conversion of pinene to camphene. Regardless of the type of catalyst used, there is always present in the resulting mixture some percentage of unchanged pinene. The presence of this pinene causes a low apparent yield of camphene because it is practically impossible to separate the pinene from the camphene by ordinary methods of distillation. In accordance with the present invention, it has been discovered that the unchanged pinene may be effectively, efficiently, and economically removed from the camphene by any of the known means of distillation, by subjecting the camphene-pinene mixture to an isomerization treatment under alkaline conditions.

The alkaline isomerization step causes the unchanged pinene to be converted to a mixture of monocyclic terpenes rich in dipentene which is a useful and desirable by-product in contradistinction to such terpenes as alpha-terpinene and terpinolene, which are not obtained as a product in accordance with this alkaline-isomerization reaction. Other by-products produced and which may be efficiently, effectively, and economically separated from camphene by means of ordinary distillation methods are allo-ocimene and para-cymene. Some camphene is also produced, thereby increasing the sum total yields of camphene desired.

The process of the present invention may be carried out by heating the mixture of terpenes including isomerizable terpenes and camphene to a temperature between about 200° C. and about 300° C. or at about the boiling point of the terpene mixture and preferably at a temperature between about 240° C. and about 270° C.

The time required for substantially complete conversion of the undesirable pinene component present in a terpene mixture containing a preponderance of camphene varies in accordance with the temperature at which the isomerization is carried out. The rate of conversion of the pinene to monocyclic terpenes particularly rich in dipentene is relatively slow at a temperature below the boiling point of the terpene mixture and the rate of conversion increases considerably as the temperature is increased approaching as an upper limit about 300° C. Maximum conversion rates are obtained between about 240° C. and about 270° C.

The alkaline catalysts or catalysts having an alkaline reaction found suitable in accordance with this invention are alkali metal and alkaline earth metal water-soluble hydroxides, carbonates, sulfites, phosphates, silicates and salts of weak acids which hydrolyze readily to give basic solutions under the conditions of temperature and pressure at which the process of this invention is carried out. Catalysts having an alkaline reaction which are especially desirable in carrying out the process of this invention are potassium hydroxide, sodium hydroxide, potassium carbonate, sodium carbonate, potassium silicate, trisodium phosphate, sodium hexa-meta-phosphate, sodium sulfite, sodium silicate, potassium sulfite, cesium hydroxide, rubidium hydroxide, etc. Other alkaline catalysts suitable for the purposes of this invention are the organic bases as, for example, tetramethyl ammonium hydroxide, guanidinium hydroxide, piperidinium hydroxide, ammonium hydroxide, triethanolamine, diamylamine, triamylamine, aniline, etc.

The ratio of the alkali catalysts may vary within wide limits, depending upon the particular catalyst being used. When potassium or sodium hydroxide is used as the catalyst, it is preferred to use these catalysts in aqueous or alcoholic solution in a concentration of between about 0.5% and about 5%.

All of the alkaline catalysts of the general types herein disclosed are suitable for isomerizing alpha-pinene to dipentene free of alpha-terpinene. However, in addition to dipentene there is obtained more or less allo-ocimene as a by-product depending on the catalyst being used. This allo-ocimene may be obtained as a monomer or polymer depending on the alkaline catalyst chosen and the pressure used. In any of them the pinene is always isomerized in the presence of an alkaline catalyst to isomers which may be readily separated from camphene by means of ordinary distillation methods as, for example, fractional distillation, using various types of towers as, bubble plate, sieve plate, packed, etc., or steam distillation using open steam, or open steam in combination with an auxiliary heating means. The distillation may be continuous or batch.

Inert solvents such as alcohols as well as water may be used as solvents for the catalyst. Suitable alcohols are methyl alcohol, ethyl alcohol, propyl alcohol, isopropyl alcohol, butyl alcohol, dihydric alcohols as, for example, ethylene glycol, diethylene glycol, propylene glycol, and trihydric alcohols such as glycerol and trimethanol menthane.

The process may be carried out continuously by passing the mixture of alpha-pinene or other terpenes capable of being isomerized under the conditions of this invention together with camphene in the presence of an alkaline catalyst through suitable tubes or other chambers maintained at a temperature above the boiling point of the terpene mixture being treated.

In view of the foregoing disclosure, it is obvious that a new process has been provided for the separation of camphene from a terpene mixture including isomerizable terpenes which comprises heating the terpene mixture above its boiling point in the presence of a catalyst having an alkaline reaction and then subjecting the resulting mixture to ordinary methods of distillation.

What we claim and desire to protect by Letters Patent is:

1. A process of separating camphene from a terpene mixture comprising camphene and pinene, said process comprising converting the pinene content of the terpene mixture to dipentene by heating said terpene mixture at a temperature between about 200° C. and about 300° C. in the presence of a dissolved catalyst having an alkaline reaction, and separating the camphene from the catalyst-treated terpene mixture comprising camphene and dipentene by distillation.

2. A process of separating camphene from a terpene mixture comprising camphene and pinene, said process comprising converting the pinene content of the terpene mixture to dipentene by heating said terpene mixture at a temperature between about 200° C. and about 300° C. in the presence of a dissolved organic base catalyst, and separating the camphene from the catalyst-treated terpene mixture comprising camphene and dipentene by distillation.

3. A process of separating camphene from a terpene mixture comprising camphene and pinene, said process comprising converting the pinene content of the terpene mixture to dipentene by heating said terpene mixture at a temperature between about 200° C. and about 300° C. in the presence of a dissolved inorganic base catalyst, and separating the camphene from the catalyst-treated terpene mixture comprising camphene and dipentene by distillation.

4. A process of separating camphene from a terpene mixture comprising camphene and pinene, said process comprising converting the pinene content of the terpene mixture to dipentene by heating said terpene mixture at a temperature between about 200° C. and about 300° C. in the presence of dissolved sodium hydroxide, and separating the camphene from the sodium hydroxide-treated terpene mixture comprising camphene and dipentene by distillation.

5. A process of separating camphene from a terpene mixture comprising camphene and pinene, said process comprising converting the pinene content of the terpene mixture to dipentene by heating said terpene mixture at a temperature between about 200° C. and about 300° C. in the presence of aqueous sodium hydroxide, and separating the camphene from the sodium hydroxide-treated mixture comprising camphene and dipentene by distillation.

6. A process of separating camphene from a terpene mixture comprising camphene and pinene, said process comprising converting the pinene content of the terpene mixture to dipentene by heating said terpene mixture at a temperature between about 200° C. and about 300° C. in the presence of dissolved triethanolamine, and separating the camphene from the triethanolamine-treated terpene mixture comprising camphene and dipentene by distillation.

7. A process of separating camphene from a terpene mixture comprising camphene and pinene, said process comprising converting the pinene content of the terpene mixture to dipentene by heating said terpene mixture at a temperature between about 200° C. and about 300° C. in the presence of dissolved diamylamine, and separating the camphene from the diamylamine-treated terpene mixture comprising camphene and dipentene by distillation.

8. A process of separating camphene from a terpene mixture comprising camphene and pinene, said process comprising converting the pinene content of the terpene mixture to dipentene by heating said terpene mixture at a temperature between about 240° C. and about 270° C. in the presence of a dissolved catalyst having an alkaline reaction, and separating the camphene from the catalyst-treated terpene mixture comprising camphene and dipentene by distillation.

9. A process of separating camphene from pinene comprising converting the pinene content of a camphene-pinene mixture to dipentene by heating said mixture at a temperature between about 200° C. and about 300° C. in the presence of a dissolved catalyst having an alkaline reaction, and separating the camphene from the dipentene by distillation.

10. A process of separating camphene from pinene comprising converting the pinene content of a camphene-pinene mixture to dipentene by heating said mixture at a temperature between about 200° C. and about 300° C. in the presence of dissolved sodium hydroxide, and separating the camphene from the dipentene by distillation.

NICHOLAS T. FARINACCI.
WILLIAM J. KIRKPATRICK.